(12) United States Patent
Naber et al.

(10) Patent No.: US 10,772,336 B2
(45) Date of Patent: Sep. 15, 2020

(54) PRECISION BAKING SYSTEM

(71) Applicant: Haier US Appliance Solutions, Inc., Wilmington, DE (US)

(72) Inventors: Christopher Nils Naber, Louisville, KY (US); Thomas Joseph Dzierzak, Cincinnati, OH (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 194 days.

(21) Appl. No.: 15/985,887

(22) Filed: May 22, 2018

(65) Prior Publication Data

US 2019/0357544 A1    Nov. 28, 2019

(51) Int. Cl.
*A21B 1/40* (2006.01)
*A47J 37/01* (2006.01)
*A21B 3/13* (2006.01)

(52) U.S. Cl.
CPC .................. *A21B 1/40* (2013.01); *A21B 3/13* (2013.01); *A21B 3/135* (2013.01); *A47J 37/01* (2013.01)

(58) Field of Classification Search
CPC .. A21B 1/40; A21B 3/13; A21B 3/133; A21B 3/135; A47J 27/00; A47J 27/002; A47J 37/01–015; A47J 2202/00; G01K 1/146; G01K 1/14; G01K 13/00; G01K 2207/02; G01K 2207/06; G01K 2207/08
See application file for complete search history.

(56) References Cited

U.S. PATENT DOCUMENTS

| 2002/0069766 | A1  | 6/2002 | Paul et al.          |
| 2008/0043809 | A1* | 2/2008 | Herbert ......... G01K 1/026 374/163 |
| 2013/0128919 | A1* | 5/2013 | Austen ............ G01K 1/14 374/110 |
| 2018/0143083 | A1* | 5/2018 | Pastore ............ G01K 1/14 |

FOREIGN PATENT DOCUMENTS

| CN | 204427623 U    | 7/2015  |                |
| CN | 204561800 U    | 8/2015  |                |
| DE | 3018265 A1 *   | 11/1981 | ........ G01K 1/14 |
| JP | 4053936 B2     | 2/2008  |                |

* cited by examiner

*Primary Examiner* — Matthew P Travers
(74) *Attorney, Agent, or Firm* — Dority & Manning, PA

(57) ABSTRACT

A precision baking system includes a baking vessel that defines a vertical direction. The baking vessel includes a base wall and at least one sidewall. An aperture is formed in one of the base wall and the sidewall. The precision baking system also includes a temperature probe. The temperature probe includes a tip and a temperature sensor within the tip. The temperature probe is sized to extend through the aperture such that the tip of the temperature probe is spaced from the base wall and the sidewall of the baking vessel when the temperature probe is fully inserted into the baking vessel through the aperture.

8 Claims, 12 Drawing Sheets

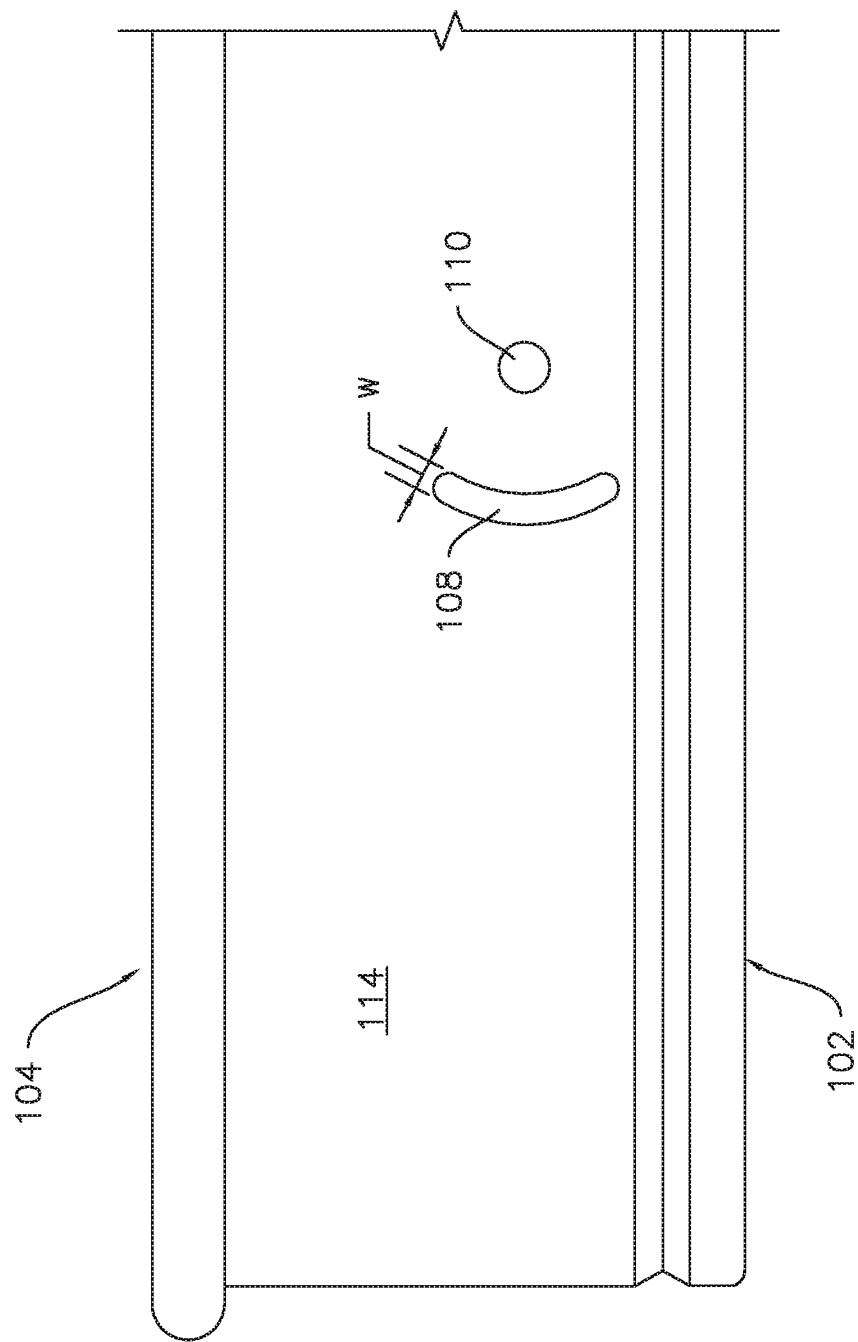

PRECISION BAKING SYSTEM

FIELD OF THE INVENTION

The present subject matter relates generally to baking utensils or vessels, and more particularly to a precision baking system including a baking vessel with improved temperature measurement.

BACKGROUND OF THE INVENTION

Traditionally, when preparing baked goods, a user will estimate when the baked goods are done based on cooking temperature and time. In some instances, the user may apply additional methods to see if the baked goods are done, such as inserting a sharp object, e.g., a toothpick, into the baked goods to visually inspect how much of the baked goods sticks to the toothpick. A user may sometimes also use an instant read thermometer to check the internal temperature of the baked goods.

Relying on cooking temperature and time alone can be inaccurate. For example, different cooking appliances may vary in the precision and accuracy with which cooking temperatures can be set and/or measured. Also, measuring cooking temperature only indirectly measures the temperature of the baked goods. Applying additional methods such as the toothpick test or instant read thermometer can be inefficient. For example, opening an oven door while the baking operation is ongoing in order to insert, e.g., the toothpick or thermometer, allows heat from the cooking chamber to escape. Also, reaching into the cooking chamber in such methods may lead to inadvertently touching a hot surface of the cooking chamber or a hot cooking rack.

Accordingly, a baking system with features for accurate and efficient assessment of the doneness of baked goods prepared with the system would be useful.

BRIEF DESCRIPTION OF THE INVENTION

Aspects and advantages of the invention will be set forth in part in the following description, or may be apparent from the description, or may be learned through practice of the invention.

In a first exemplary embodiment, precision baking system is provided. The precision baking system includes a baking vessel that defines a vertical direction. The baking vessel includes a base wall and a sidewall. An aperture is formed in the sidewall. The precision baking system also includes a temperature probe. The temperature probe includes a tip and a temperature sensor within the tip. The temperature probe is sized to extend through the aperture such that the tip of the temperature probe is spaced from the base wall and the sidewall of the baking vessel when the temperature probe is fully inserted into the baking vessel through the aperture. The temperature probe may be selectively positioned at one of a plurality of vertical positions within the aperture when the temperature probe extends through the aperture.

In a second exemplary embodiment, a temperature probe is provided. The temperature probe includes a tip, a temperature sensor within the tip surrounded by a sheath, a shaft extending between the tip and a distal end, and a flange slidably mounted on the shaft. The flange includes a resilient material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 9 provides a partial side view of a baking vessel or utensil as may be incorporated in the precision baking system of FIG. 8.

DETAILED DESCRIPTION

Figure 1:
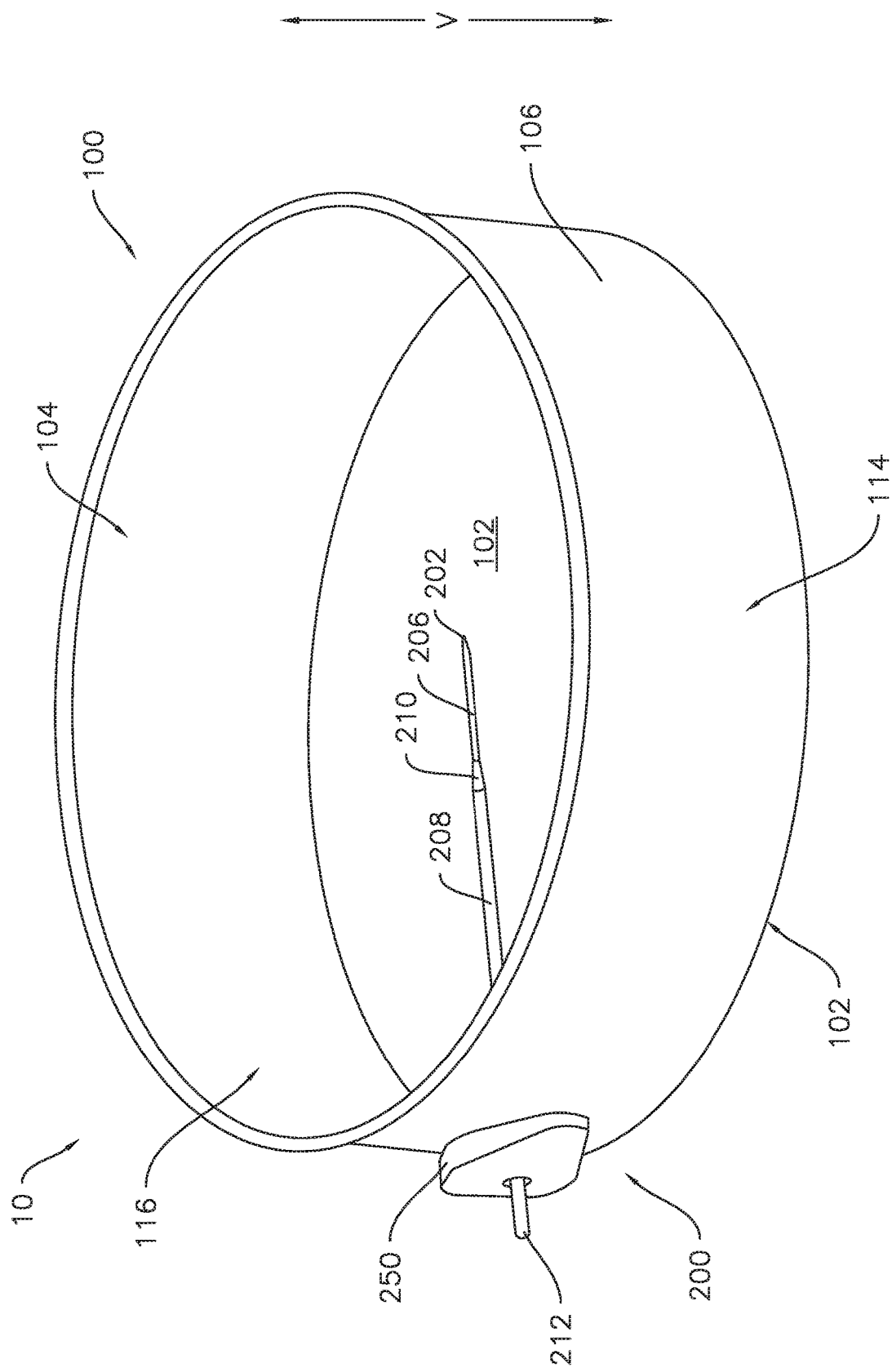
FIG. 1 provides a perspective view of a precision baking system according to one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As illustrated in FIGS. 1, 2, 4, and 8, the precision baking system 10 includes a baking utensil or vessel 100, such as a round cake pan as in the illustrated embodiments. The baking vessel 100 defines a vertical direction V. The baking vessel 100 extends between a base wall 102 and an opening 104 along the vertical direction V. At least one sidewall 106 extends between the base wall 102 and the opening 104, and the at least one sidewall 106 may be oriented generally along the vertical direction V, as illustrated for example in FIG. 1. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees either clockwise or counterclockwise with the vertical direction V. In some embodiments, the at least one sidewall may be oblique to the vertical direction V such that the baking vessel 100 tapers down or narrows from the opening 104 towards the base wall 102. In additional embodiments, the baking vessel 100 may include more than one sidewall 106, e.g., the baking vessel 100 may be square or rectangular with four sidewalls 106.

Figure 2:
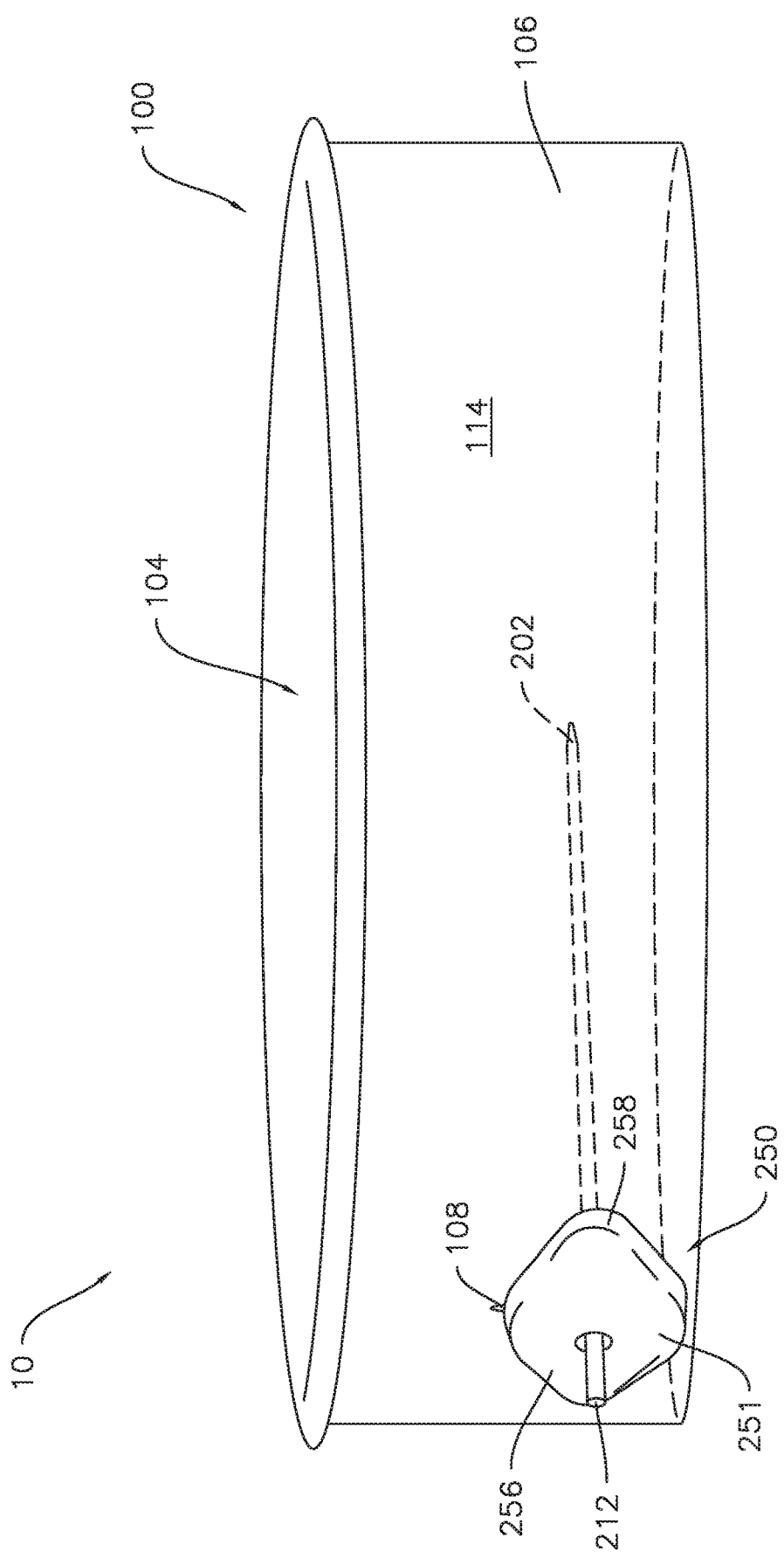
FIG. 2 provides a side view of a precision baking system according to one or more embodiments of the present subject matter.

As illustrated for example in FIGS. 1 and 2, the baking vessel 100 defines a cooking volume 116, e.g., an internal space or volume defined by the base wall 102 and the sidewall 106, into which ingredients or other items to be cooked may be placed through the opening 104.

Figure 3:
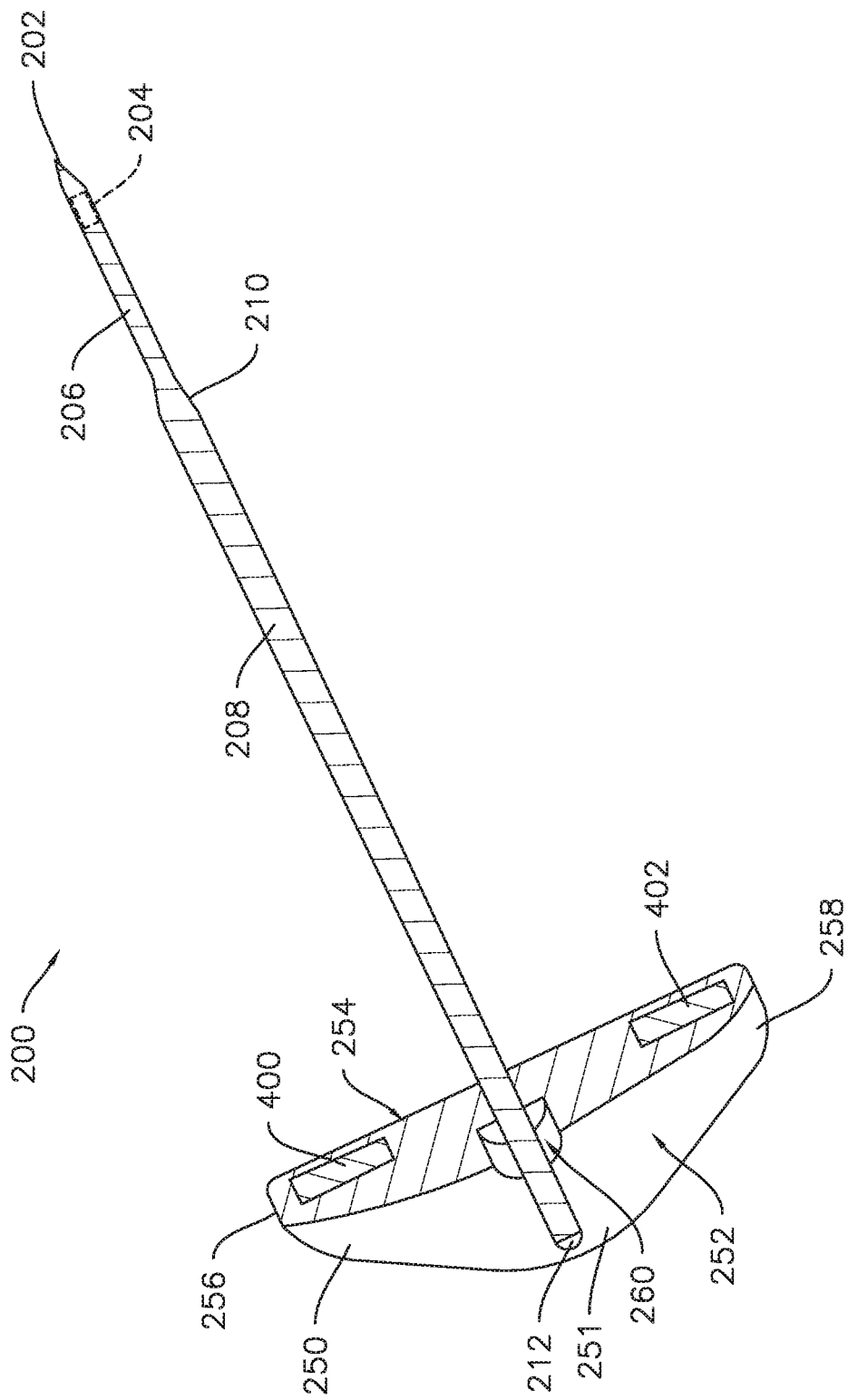
FIG. 3 provides a sectioned perspective view of a temperature probe as may be incorporated in a precision baking system according to one or more embodiments of the present subject matter.
Figure 7:
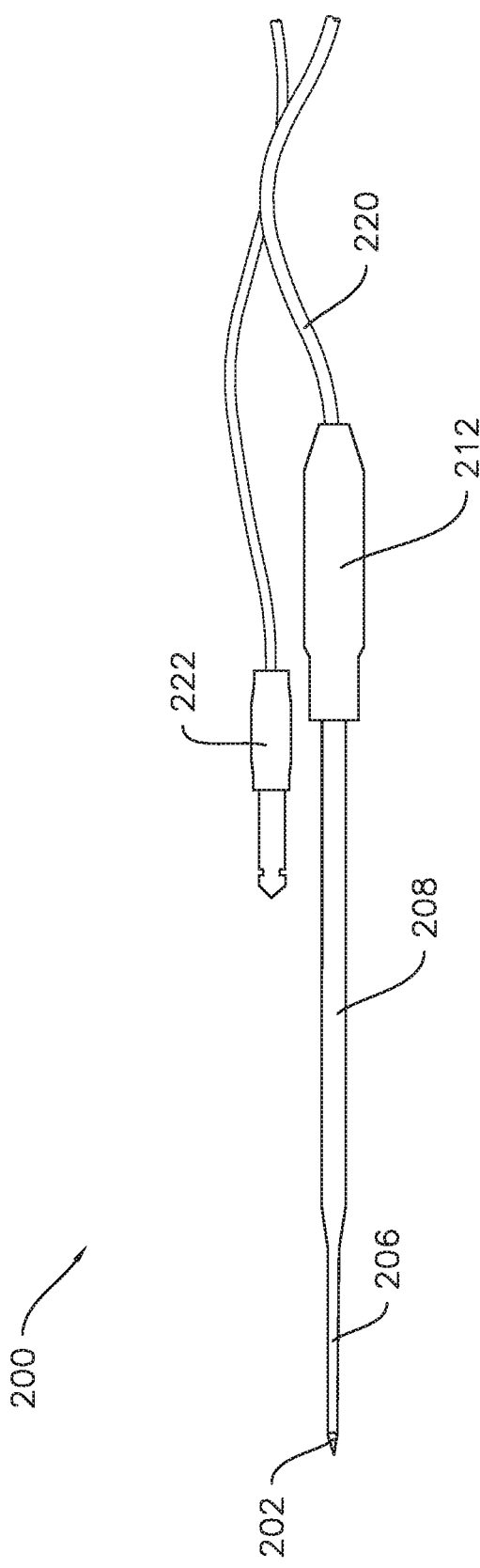
FIG. 7 provides a vies of an exemplary temperature probe as may be incorporated in a precision baking system according to one or more embodiments of the present subject matter.
Figure 8:
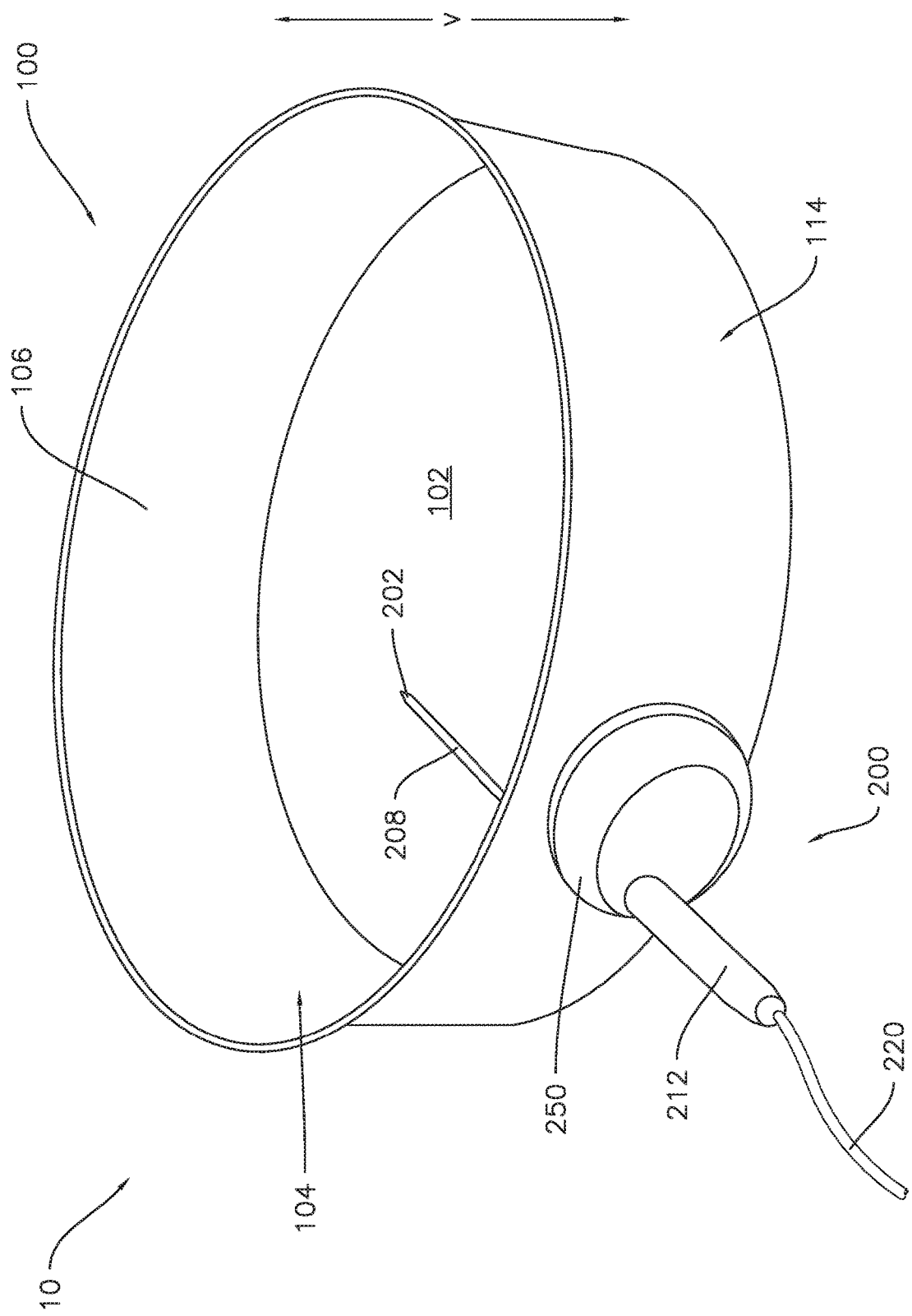
FIG. 8 provides a perspective view of a precision baking system according to one or more additional embodiments of the present subject matter.
Figure 11:
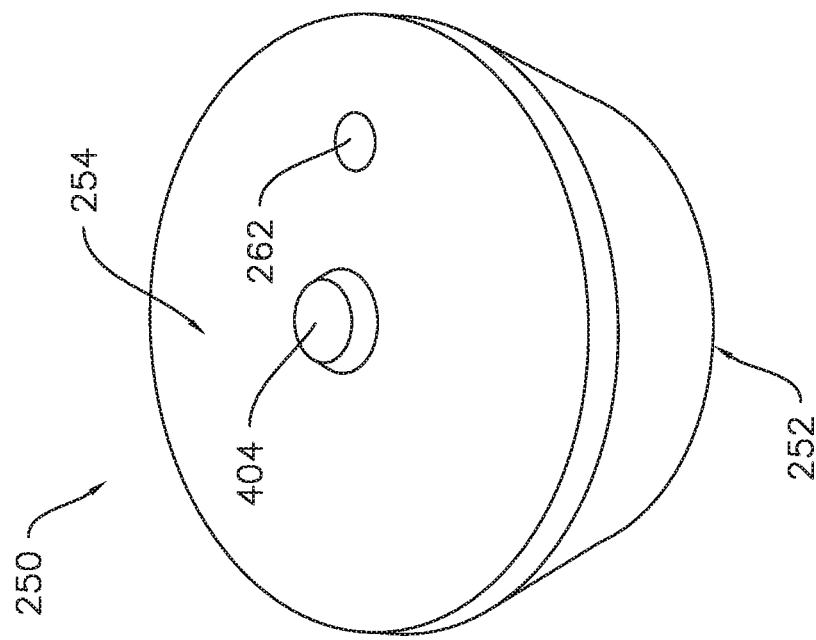
FIG. 11 provides an internal side perspective view of the flange of FIG. 10.
Figure 10:
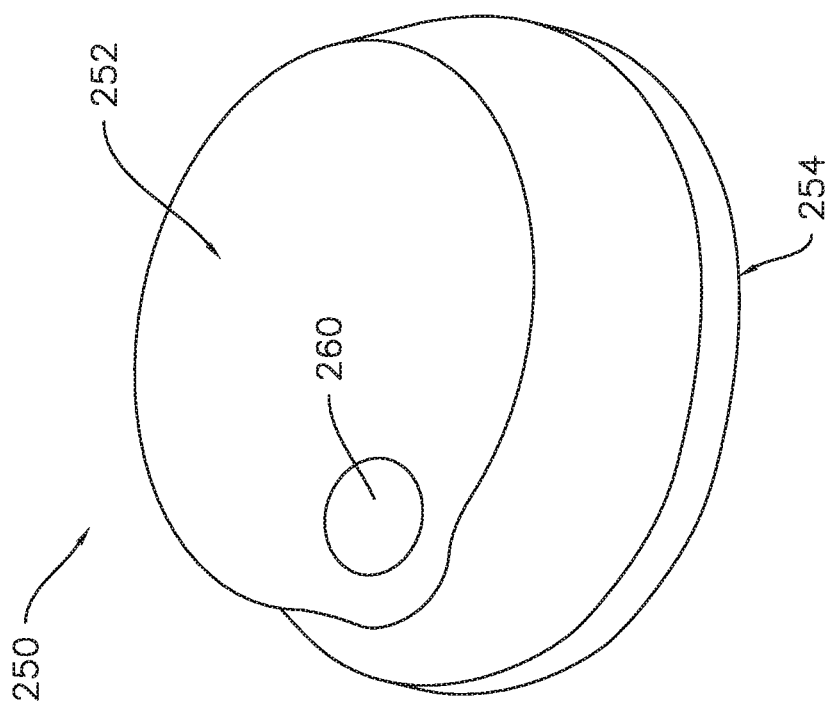
FIG. 10 provides an external side perspective view of a flange or holder for a temperature probe as may be incorporated in a precision baking system according to one or more embodiments of the present subject matter.
Figure 12:
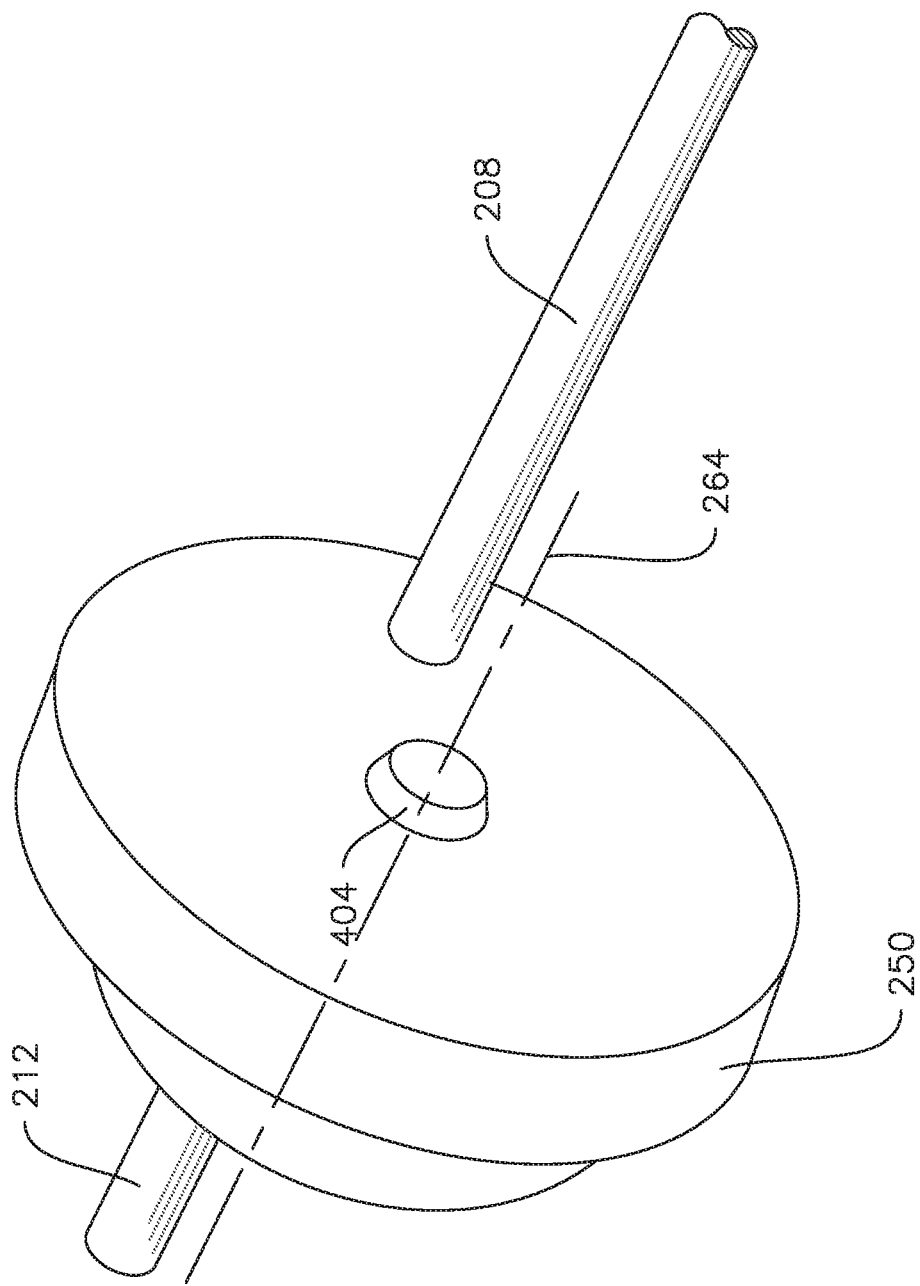
FIG. 12 provides a partial perspective view of the flange of FIG. 10 with a temperature probe extending therethrough.

As may be seen, e.g., in FIGS. 1 through 3, 7, and 8, the precision baking system 10 also includes a temperature probe 200. As illustrated in FIGS. 1, 3, and 8, the temperature probe 200 includes a tip 202 and a temperature sensor 204 (FIG. 3) within the tip 202. For example, the tip 202 may be defined by a metal sheath 206 surrounding the temperature sensor 204. The sheath 206 may also be any suitable material which provides the desired thermal conductivity for the temperature sensor 204 to measure a temperature of material, e.g., baked goods, in contact with the sheath 206. The temperature probe 200 may also include a distal portion 212 distal from the tip 202.

Figure 5:
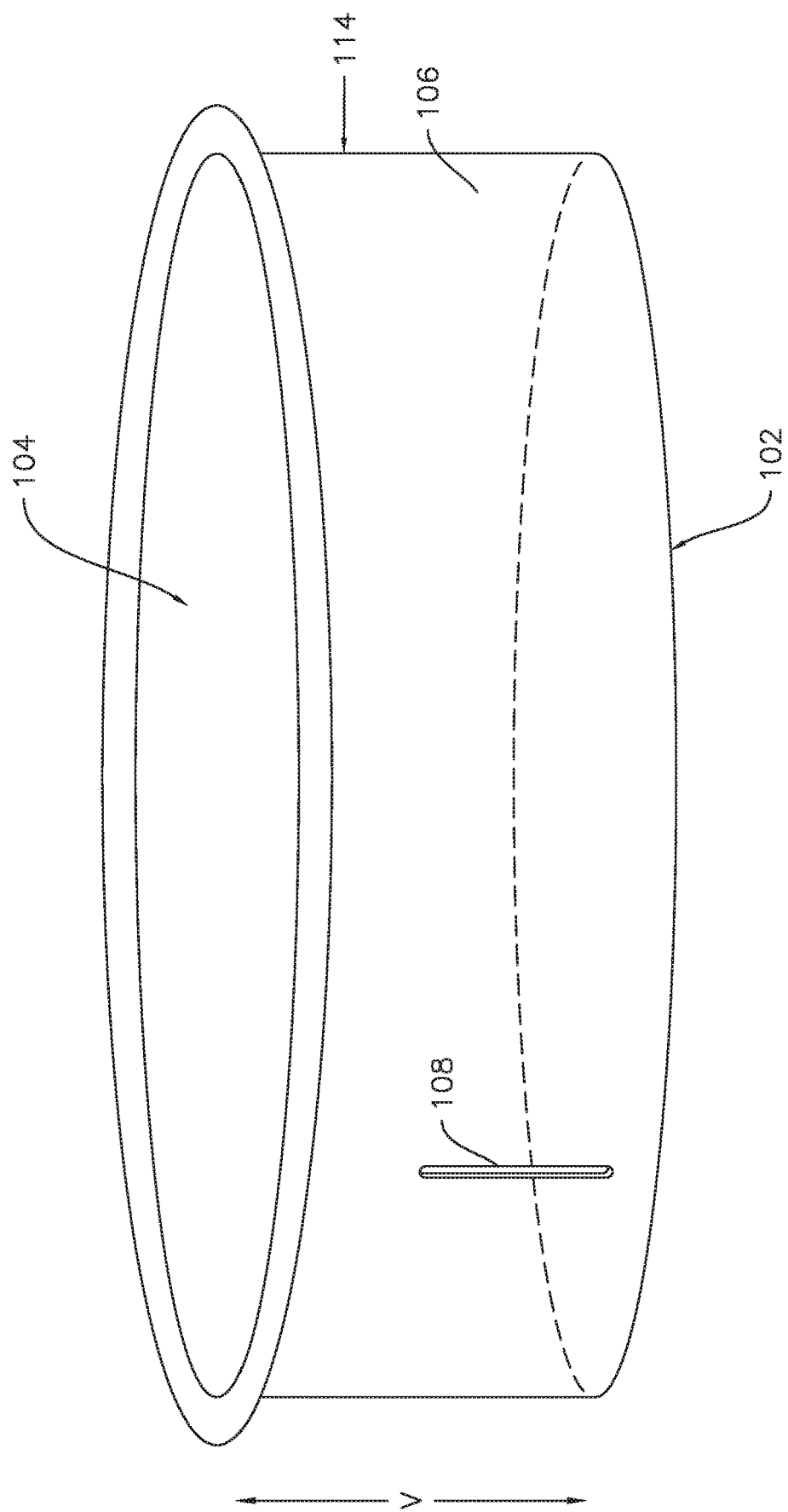
FIG. 5 provides a perspective view of a baking vessel or utensil as may be incorporated in a precision baking system according to one or more embodiments of the present subject matter.

As may be seen, e.g., in FIGS. 2, 5, and 9, the baking vessel 100 includes an aperture 108 in the at least one sidewall 106. As shown in FIGS. 1, 2, and 8 the temperature probe 200 may be sized to extend through the aperture 108 in the sidewall 106. For example, the aperture 108 may be an elongated aperture having a height H (FIG. 6) along the vertical direction V and a width W (FIG. 6) perpendicular to the height H. In other embodiments, e.g., as best seen in FIG. 9, the aperture 108 may be a first aperture which is arcuate and the baking vessel 100 may include a second aperture 110. The arcuate aperture 108 in embodiments such as the example illustrated in FIG. 9 also defines a width W. In various embodiments, the temperature probe 200 may include a circular portion, e.g., a shaft 208 and in particular a cross-section thereof, having a diameter approximately equal to or slightly less than the width of the aperture 108 so that the shaft 208 can pass through the aperture 108.

The temperature probe 200 may include a holder or slidable flange 250. For example, the temperature probe 200 may define a length from the distal portion 212 to the tip 202. The flange 250 may be slidable along the length of the temperature probe 200. The flange 250 may be round, e.g., circular or elliptical, and may have a major dimension, e.g., diameter, greater than a corresponding dimension of the aperture 108 so that the flange 250 will not pass through the aperture 108.

Additionally, the temperature probe 200 may be sized to extend through the aperture 108 such that the tip 202 of the temperature probe 200 is spaced apart from the base wall 102 and the sidewall 106, e.g., by a sufficient distance that temperature measurements made by the temperature probe 200 are not influenced by radiant heat from the base wall 102 or the side wall 106. Accordingly, the temperature probe 200 may more accurately measure the internal temperature of baked goods within the baking vessel 100. For example, in some embodiments, the temperature probe 200 may comprise a sufficient length such that the tip 202 can be at least about two inches (2") from any of the base wall 102 and the sidewall 106 when the temperature probe 200 is inserted into the baking vessel 100 through the aperture 108. As another example, the temperature probe 200 may be proximate the geometric center of the baking vessel 100 when the temperature probe 200 is inserted into the baking vessel 100 through the aperture 108.

As used herein, the term "geometric center" may refer to a two-dimensional geometric center or a three-dimensional geometric center of the baking vessel 100. For example, where the baking vessel is generally cylindrical, a geometric center of the baking vessel may be a two-dimensional geometric center, e.g. a center of the circular cross-section of the cylindrical vessel defined at any point along the height of the cylinder. As another example, a geometric center of the cylindrical baking vessel may be a three-dimensional geometric center, e.g. a center of the circular cross-section of the cylindrical vessel at the center of the height of the cylinder. Thus, for example, in embodiments where the temperature probe may be selectively positioned at one of a plurality of vertical positions within the aperture, the tip 202 of the temperature probe 200 may be proximate at least a two-dimensional geometric center of the baking vessel 100, e.g., the center of the circular cross-section of the round baking vessel, when the temperature probe 200 is inserted through the aperture 108.

Figure 6:
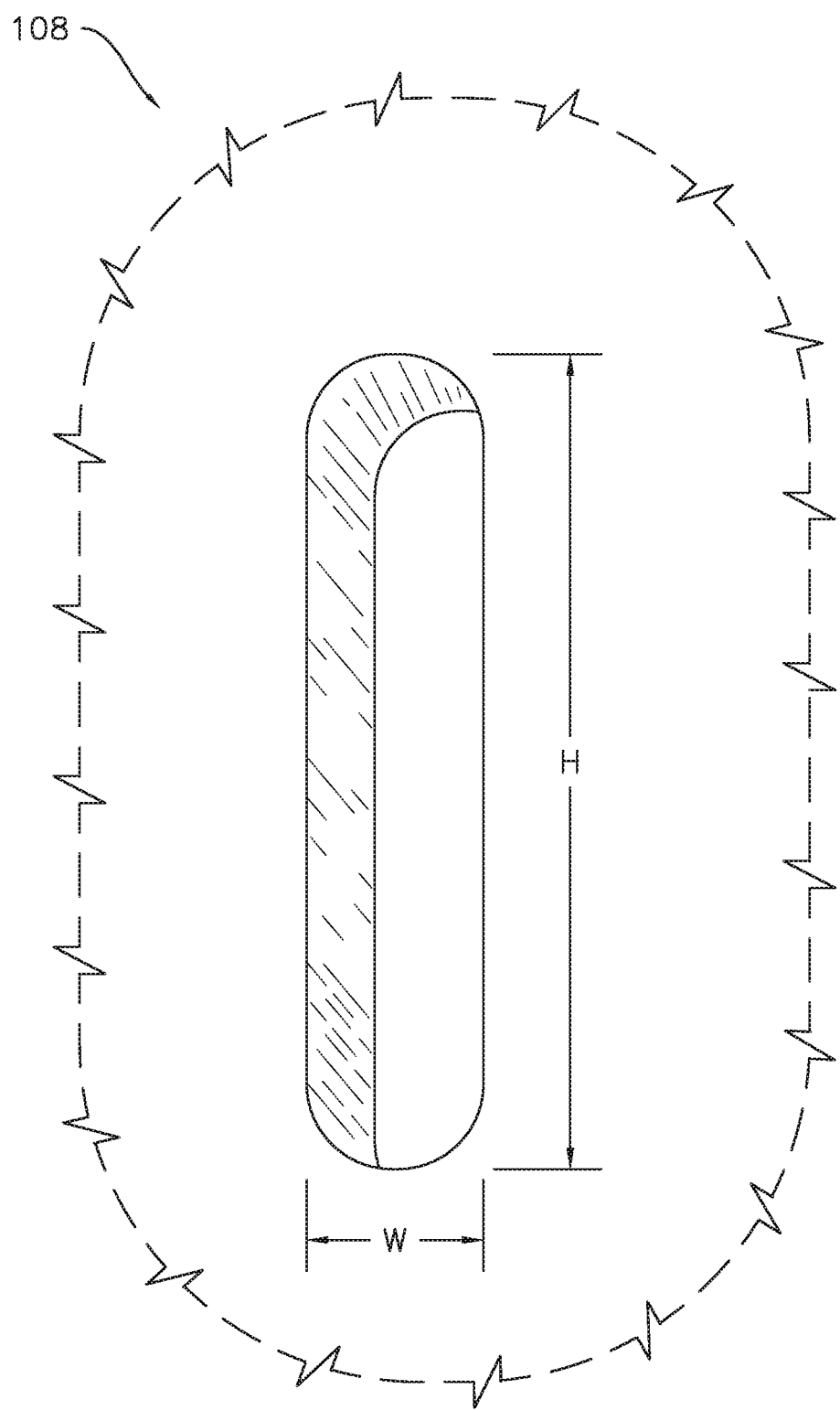
FIG. 6 provides an enlarged view of an aperture in the baking vessel of FIG. 5.

As most clearly shown in FIG. 6, the aperture 108 defines the height H along the vertical direction V and the width W generally perpendicular to the vertical direction V. For example, the width W may be oriented along a circumferential direction extending along an outermost perimeter of the baking vessel 100. As mentioned above, the temperature probe 200 may have a diameter approximately equal to or slightly less than the width W of the aperture 108 so that the shaft 208 can pass through the aperture 108. In some embodiments, the height H of the aperture 108 may be at least three times greater than the diameter of the temperature probe 200.

As mentioned above, the baking vessel 100 may include an arcuate first aperture 108 and a circular second aperture. The second aperture 110 may be circular and may be located relative to the arcuate first aperture 108 such that a center of the second aperture 110 is positioned at a center of curvature of the arcuate first aperture 108. In such embodiments, the flange 250 may be centered on the second aperture 110 whereby the temperature probe 200 extends through the flange 250 and the arcuate first aperture 108 such that the temperature probe 200 may be adjusted within the arcuate first aperture 108 by rotating the flange 250, as described in more detail below.

Accordingly, in various embodiments the temperature probe 200 may be selectively positioned at one of a plurality of vertical positions within the aperture 108 when the temperature probe 200 extends through the aperture 108. For example, in the embodiments of FIGS. 5 and 6, the plurality of vertical positions are along a generally vertical straight line. As another example, in embodiments such as is illustrated in FIG. 9, the temperature probe 200 may be selectively positioned at one of the plurality of vertical positions by rotating the flange 250. A higher position along the vertical direction V may be used or selected when the baking pan is full and a lower position along the vertical direction V within the aperture 108 may be used when baking a smaller baked good. In some instances, the selected one of the plurality of vertical positions within the aperture 108 may depend on the type of food being cooked. For example, baked goods generally comprise rising baked goods and non-rising baked goods. When cooking a rising baked good, the temperature probe 200 may be positioned at a vertical position within the aperture 108 such that the probe 200 corresponds to about one-half of a vertical height of the rising baked good.

As mentioned above, the temperature probe 200 may also include a shaft 208 extending from the distal portion 212 towards the tip 202, e.g., to tapered portion 210 as shown in FIG. 3. When the temperature probe 200 is fully inserted into the baking vessel 100 through the aperture 108, the shaft 208 extends through the aperture 108 towards the tip 202 of the temperature probe 200 while the flange 250 surrounds the aperture 108 and abuts the exterior surface 114 of the baking vessel 100. The flange 250 may comprise a resilient and thermally insulative material. For example, the flange 250 may comprise a resilient and thermally insulative material such as a rubber material, e.g., a silicone rubber.

In embodiments where the flange 250 comprises a resilient material, the flange 250 may sealingly engage the exterior surface 114 of the baking vessel 100 to sealingly enclose the aperture 108 when the temperature probe 200 is inserted into the baking vessel 100 through the aperture 108.

The precision baking system 10 may also include features to help hold the temperature probe 200 in place when the temperature probe 200 is inserted into the baking vessel 100 through the aperture 108. For example, as shown in FIG. 3, a high-temperature magnet 400 may be positioned on the temperature probe 200. In such embodiments, the high-temperature magnet 400 engages the baking vessel 100 to retain the temperature probe 200 in an inserted position where the temperature probe 200 extends into the cooking volume 116 of the baking vessel 100 through the aperture 108 when the temperature probe 200 is in the inserted position.

Figure 4:
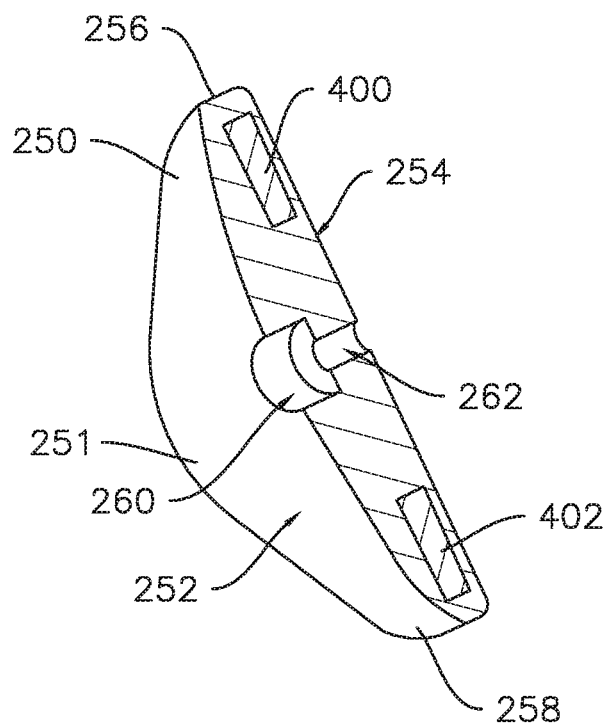
FIG. 4 provides a sectioned perspective view of a flange or holder for the temperature probe of FIG. 3.

In some embodiments, the high-temperature magnet 400 may be positioned in the flange 250 of the temperature probe 200. For example, the high-temperature magnet 400 may be embedded in the flange 250. Some embodiments may include a first high-temperature magnet 400 and a second high-temperature magnet 402. For example, as best seen in FIGS. 3 and 4, the flange 250 may include a central portion 251 with a first ear 256 extending from one side of the central portion 251 and a second ear 258 extending from an opposite side of the central portion 251. For example, the first ear 256 and the second ear 258 may be diametrically opposite one another. In some embodiments, e.g., where the flange 250 comprises a silicone rubber material or other similar material, the material of the flange 250 may be overmolded on the first high temperature magnet 400 and the second high temperature magnet 402. The first high temperature magnet 400 and the second high temperature magnet 402 may be embedded in the first ear 256 and the second ear 258, respectively. For example, the first ear 256 may be overmolded on the first high-temperature magnet 400 and the second ear 258 may be overmolded on the second high-temperature magnet 402. As used herein, the term "high-temperature" includes temperatures well above room temperature, for example, temperatures such as may be used in a baking operation. For example, high-temperature may include temperatures above about 250° F., such as about 300° F. or higher, such as about 450° F. or higher. As such, one of ordinary skill in the art will recognize that the high-temperature magnet 400 may be any suitable magnet which can be employed in a high-temperature environment such as inside an oven during a baking operation.

Still referring to FIGS. 3 and 4, the flange 250 may extend between an external surface 252 and an internal surface 254. The first high temperature magnet 400 and the second high temperature magnet 402 may be positioned at or proximate the internal surface 254 of the flange 250. For example, the internal surface 254 may be a surface that abuts and/or is in direct contact with the exterior surface 114 of the baking vessel 100 when the flange 250 is positioned on the baking vessel 100.

The flange 250 may also include a countersink 260 in the external surface 252 of the flange 250. The countersink 260 may serve as a guide for inserting temperature probe 200 into and through the flange 250. In some embodiments, the flange 250 may include a channel 262 at an inner side (e.g., closer to the internal surface 254) of the flange 250. The countersink 260 may have a relatively larger diameter to readily receive the temperature probe 200 while the channel 262 may have a relatively smaller diameter, e.g., about the same as the diameter of the shaft 208 of the temperature probe 200 such that that the channel 262 of the flange 250 forms an interference fit with the shaft 208 and sealingly engages the shaft 208 when the temperature probe 200 is in the inserted position.

In various embodiments, the flange 250 may serve as a holder for the temperature probe 200. For example, the flange 250 may be mounted on the baking vessel 100, e.g., with magnets 400 and 402, proximate the aperture 108. Once the flange 250 is in place on the baking vessel 100, the temperature probe 200 may be slidably inserted through the countersink 260 and the channel 262 and into the cooking volume 116. As such, the flange 250 may be slidably mounted on the temperature probe 200, and in particular the shaft 208 thereof, as described above.

The temperature probe 200 may be configured for operative communication with an external device. The external device may be a controller of an oven appliance, a display of an oven appliance, a portable device such as a smart phone or smart watch, or a dedicated display. The temperature probe 200 may be in operative communication with such devices via a wired or wireless connection. The temperature probe 200 may be operable to send a signal to the external device, the signal representing or indicating one or more sensed temperature values from temperature sensor 204 of temperature probe 200. For example, in some embodiments, the temperature probe 200 may include a wireless transmitter to provide a wireless connection. As shown in FIG. 7, in some example embodiments, the temperature probe 200 may include a wire 220 in operative communication with the temperature sensor 204 to provide a wired connection. The wire 220 may extend between the distal portion 212 of the probe 200 and a plug 222. The plug 222 may be configured to be received in a jack (not shown), e.g., of an oven appliance to transmit signals from the temperature sensor 204 to a controller of the oven appliance via the wire 220.

Figure 13:
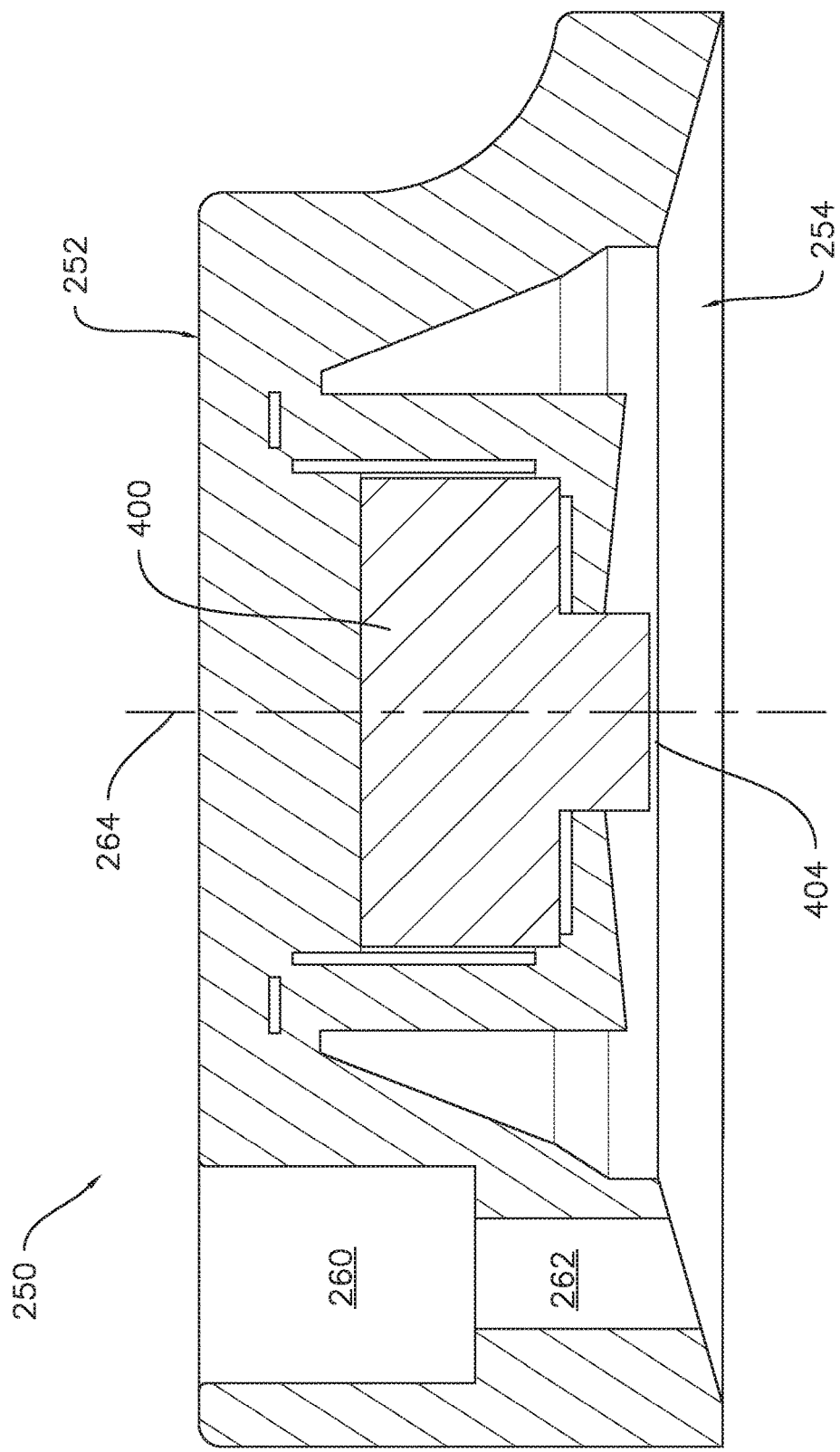
FIG. 13 provides a sectioned perspective view of the flange of FIG. 10.

As seen in FIGS. 10 through 13, the countersink 260 and channel 262 in the flange 250 may be offset from a centerline 264 (FIGS. 12 and 13) of the flange 250. The internal surface 254 of the flange 250 may include a post 404 projecting inward, e.g., towards the baking vessel 100 when the flange 250 is mounted on the exterior surface 114 thereof, from the internal surface 254 at the center, e.g., at a point along the centerline 264, of the flange 250. In some embodiments, the post 404 may be a distinct piece molded into the flange 250. In other embodiments, the post 404 may be integrally formed with the magnet 400, e.g., as shown in FIG. 13. In embodiments of the flange 250 including the central post 404, the post 404 may be received in the circular second aperture 110 shown in FIG. 9, whereby the channel 262 and the temperature probe 200 extending therethrough may be aligned with the arcuate first aperture 108, also shown in FIG. 9, such that the vertical position of the probe 200 relative to the baking vessel 100 may be adjusted by rotating the flange 200 like a knob or dial. Thus, some embodiments of the precision baking system 10 include the baking vessel of FIG. 9 with the arcuate first aperture 108 and the circular second aperture 110 and the flange 250 of FIGS. 10 and 11, where a radial distance between the apertures 108 and 110 of the baking vessel 100 corresponds to a distance between the post 404 and the channel 262 of the flange 250, so the parts may be aligned as described in the foregoing.

As mentioned above, the flange 250 may sealingly engage the exterior surface 114 of the baking vessel 100 to sealingly enclose the aperture 108 when the temperature probe 200 is inserted into the baking vessel 100 through the aperture 108. Further, in embodiments where the baking vessel includes the second aperture 110, the flange 250 may sealingly enclose both apertures 108 and 110. For example, as illustrated in FIG. 13, the internal surface 254 of the flange 250 may be concave to promote or enhance sealing engagement of the internal surface 254 of the flange 205 with the external surface 114 of the baking vessel 100. For example, in such embodiments, the concave internal surface 254 may deform when the magnet 400 is attracted to the external surface 114 of the baking vessel 100, in a similar manner as a suction cup.

It should be appreciated that the present subject matter is not limited to any particular style, model, or configuration of baking vessel. The exemplary embodiment depicted is simply provided for illustrative purposes only. For example, the baking vessel may include more than one sidewall, e.g., as in a square or rectangular pan, or a Bundt pan, and other differences may be applied as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A baking system, comprising:
   a baking vessel defining a vertical direction, the baking vessel comprising a base wall and a sidewall;
   a first aperture in the sidewall;
   a second aperture in the sidewall: and
   a temperature probe comprising a shaft, a tip, a temperature sensor within the tip, a flange slidably mounted on the shaft, and a high temperature magnet embedded in the flange, the temperature probe defining a diameter and sized to extend through the first aperture such that the tip of the temperature probe is spaced from the base wall and the sidewall of the baking vessel when the temperature probe is inserted into the baking vessel through the first aperture;
   wherein the temperature probe may be selectively positioned at one of a plurality of vertical positions within the first aperture when the temperature probe extends through the first aperture, and wherein a portion of the high-temperature magnet is received in the second aperture and the temperature probe extends through the first aperture when the temperature probe is in an inserted position.

2. The baking system of claim 1, wherein the high-temperature magnet engages the baking vessel to retain the temperature probe in the inserted position, the temperature probe extending into a cooking volume of the baking vessel through the first aperture when the temperature probe is in the inserted position.

3. The baking system of claim 1, wherein the shaft extends through the first aperture towards the tip and the flange surrounds the first aperture and abuts an exterior surface of the baking vessel when the temperature probe is inserted into a cooking volume of the baking vessel through the first aperture.

4. The baking system of claim 3, wherein the flange comprises a resilient material and the resilient material of the flange sealingly engages the exterior surface of the baking vessel to sealingly enclose the first aperture when the temperature probe is inserted into the cooking volume of the baking vessel through the first aperture.

5. The baking system of claim 1, wherein the first aperture defines a width generally equal to the diameter of the temperature probe.

6. The baking system of claim 1, wherein the high temperature magnet is a first high temperature magnet and the flange comprises a silicone rubber material overmolded on the first high temperature magnet and a second high temperature magnet.

7. The baking system of claim 1, wherein the flange comprises a silicone rubber material overmolded on the high temperature magnet, and wherein the high temperature magnet comprises a center post which extends from an internal surface of the flange.

8. The baking system of claim 1, wherein the first aperture is arcuate and defines a center of curvature, and wherein the second aperture is circular and centered on the center of curvature of the arcuate first aperture.

* * * * *